US006616051B1

(12) United States Patent
Zidon

(10) Patent No.: US 6,616,051 B1
(45) Date of Patent: Sep. 9, 2003

(54) APPARATUS FOR AND METHOD FOR MARKING OBJECTS, OBJECTS MARKED THEREBY AND APPARATUS AND METHOD OF READING MARKED OBJECTS

(75) Inventor: Aharon Zidon, Givatayim (IL)

(73) Assignee: Authentic Ltd., Ramat Gan (IL)

( * ) Notice: Subject to any disclaimer, the term of this patent is extended or adjusted under 35 U.S.C. 154(b) by 0 days.

(21) Appl. No.: 09/605,808

(22) Filed: Jun. 28, 2000

(51) Int. Cl.[7] .................................... G06K 19/00

(52) U.S. Cl. ...................... 235/487; 235/375; 235/491; 378/2; 378/35

(58) Field of Search ................................ 235/375, 487, 235/491; 250/271, 303, 395, 491.1, 493.1; 378/1, 2, 34, 35

(56) References Cited

U.S. PATENT DOCUMENTS 3,564,215 A * 2/1971 Peeples et al. .............. 235/491
4,445,225 A * 4/1984 White ........................ 235/491
4,765,655 A * 8/1988 Crihan ....................... 250/303
4,964,146 A * 10/1990 Kuniyoshi et al. ....... 250/491.1
5,124,935 A * 6/1992 Wallner et al. ............. 347/225
5,177,360 A * 1/1993 Fernandez-Rubio ........ 250/303
5,313,193 A * 5/1994 Dubois et al. .............. 235/454
6,212,504 B1 * 4/2001 Hayosh ...................... 235/375

* cited by examiner

*Primary Examiner*—Michael G. Lee
*Assistant Examiner*—Steven S. Paik
(74) *Attorney, Agent, or Firm*—GE Ehrlich (1995) Ltd.

(57) ABSTRACT

An apparatus for marking objects is disclosed. The apparatus comprises (a) a source device including a mother isotope for emitting daughter isotopes by radioactive decay; preferably (b) a positioning mechanism for positioning an object in close proximity to the source device; and (c) a patterning mechanism for restricting implantation of the daughter isotopes into a surface of the object, so as to create a detectable pattern of the daughter isotopes on the object.

9 Claims, 4 Drawing Sheets

Fig. 3
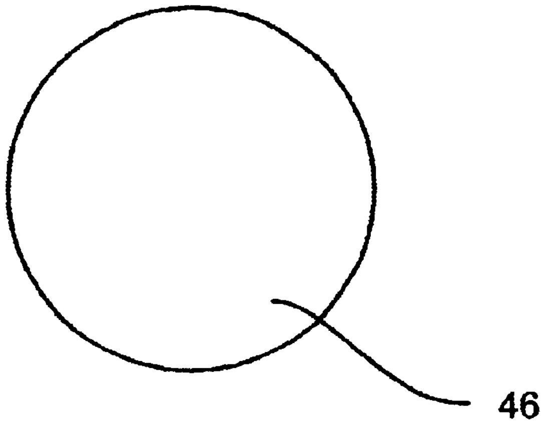
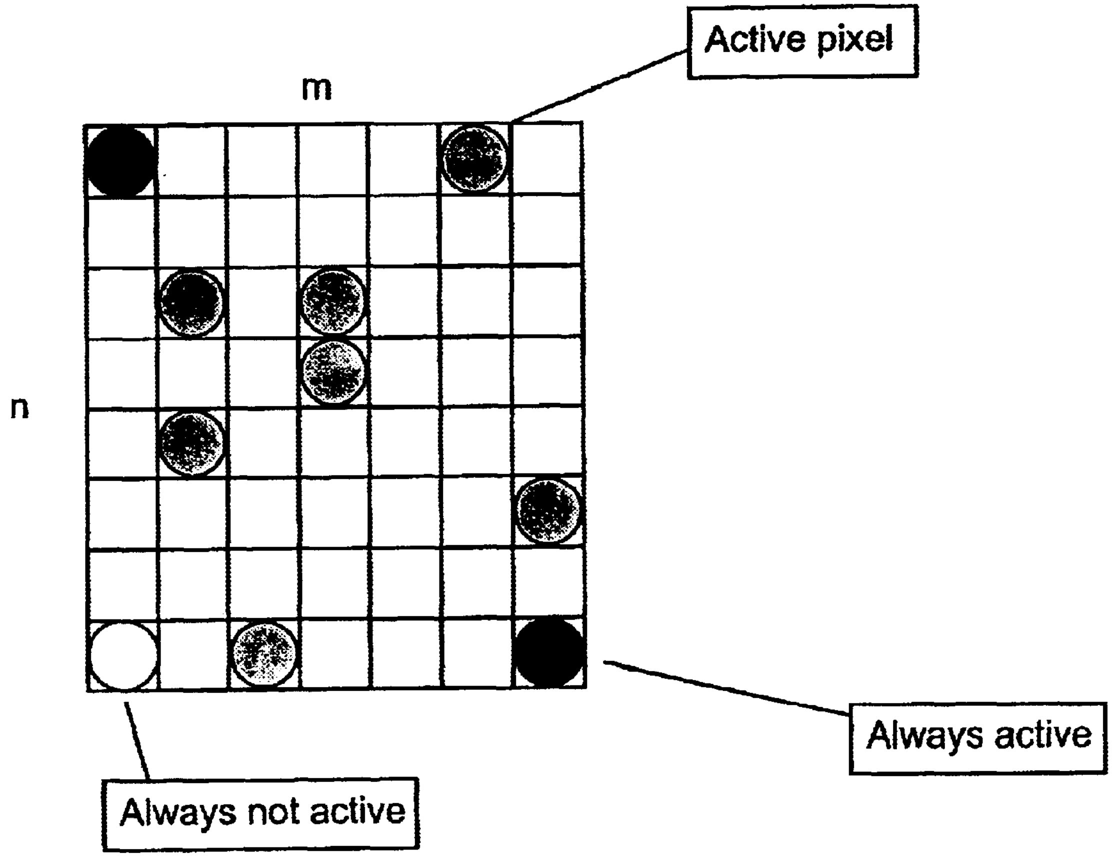
Fig. 4

1 mm

APPARATUS FOR AND METHOD FOR MARKING OBJECTS, OBJECTS MARKED THEREBY AND APPARATUS AND METHOD OF READING MARKED OBJECTS

FIELD AND BACKGROUND OF THE INVENTION

The present invention relates to an apparatus for and a method of marking objects, objects marked thereby and an apparatus for and a method of reading such marked objects. More particularly, the present invention relates to an apparatus for and a method of radioactively marking objects, objects radioactively marked thereby and an apparatus for and a method of reading such radioactively marked objects.

In theft of gemstones and other objects of value which have no unique identifying features, such as vehicle parts, the most common difficulty is accurately identifying a stolen object as being a particular object which was stolen from a certain owner. This problem is of particular concern to insurance companies, in that gems and other objects of value are often insured and it has been difficult to identify the stolen object even if it is recovered. Insurance companies in the past have also been subject to fraudulent claims. Thus, identification of objects of value and the tracking of thereof remains a problem.

A number of systems have been proposed for identifying gemstones, as well as other objects of value, insured objects, numbered objects and/or licensed objects, to provide what may be referred to as an identification pattern of the object.

One example is provided by U.S. Pat. No. 5,124,935 which teaches optical fingerprints of gemstones. Although, the optical fingerprint is accurate and acceptable by the courts for determining whether a gemstone under consideration is the same gemstone which produced a previously recorded fingerprint, this method is limited in applicability to cases wherein natural variability among objects of the same type exists and is therefore inappropriate for more widespread applications.

Other examples involve inscription of information by physically removing substance, e.g., by a physical scraper, laser or plasma. These methods are limited for obvious reasons. First, these methods result in a visible mark, which therefore has to be kept minimized. Second, being of small dimensions, the mark is readily altered or removed altogether. Third, a central facility is required to apply such inscriptions. Fourth, in some cases, such as when marking gemstones, the inscription process may result in damaging the stone beyond the damage inherently associated with inscription marking techniques.

There is thus a widely recognized need for, and it would be highly advantageous to have, an apparatus and method for marking objects, objects marked thereby and means with which one can read the information marked on the objects, which are devoid of the above limitations.

SUMMARY OF THE INVENTION

According to one aspect of the present invention there is provided an apparatus for marking objects, the apparatus comprising (a) a source device including a mother isotope for emitting daughter isotopes by radioactive decay; preferably, (b) a positioning mechanism for positioning an object in close proximity to the source device; and (c) a patterning mechanism for restricting implantation of the daughter isotopes into a surface of the object, so as to create a detectable pattern of the daughter isotopes on the object.

According to another aspect of the present invention there is provided an article of manufacture comprising an object having a surface, the surface including implanted therein a predetermined and detectable pattern of a radioactive isotope.

According to yet another aspect of the present invention there is provided a method of marking an object, the method comprising the step of implanting into a surface of the object a predetermined and detectable pattern of a daughter radioactive isotope.

According to still another aspect of the present invention there is provided an apparatus for detecting a radioactive pattern of a radioactive isotope being implanted in a predetermined and detectable pattern in a surface of a three dimensional object, the apparatus comprising (a) a position sensitive radioactivity detector; and (b) an acceptor for accepting the three dimensional object and for positioning the surface of the three dimensional object in close proximity to the position sensitive radioactivity detector so as to permit detection of the pattern by the position sensitive radioactivity detector.

According to an additional aspect of the present invention there is provided a method of detecting a radioactive pattern of a radioactive isotope being implanted in a predetermined and detectable pattern in a surface of a three dimensional object, the method comprising the steps of (a) providing a position sensitive radioactivity detector; and (b) positioning the surface of the three dimensional object in close proximity to the position sensitive radioactivity detector so as to permit detection of the pattern by the position sensitive radioactivity detector.

According to further features in preferred embodiments of the invention described below, the acceptor is a keyhole, whereas, the three dimensional object is a key, such that only a specific pattern, as detected by the position sensitive radioactivity detector, results in the keyhole operatively responding to the key.

According to still an additional aspect of the present invention there is provided a method of detecting a radioactive pattern of a radioactive isotope being implanted in a predetermined and detectable pattern in a surface of a three dimensional object, the method comprising the steps of (a) implanting radioactive isotopes emitted from the object into a surface of an intermediate medium; and (b) positioning the surface of the intermediate medium in close proximity to a position sensitive radioactivity detector so as to permit detection of the pattern by the position sensitive radioactivity detector.

According to further features in preferred embodiments of the invention described below, the patterning mechanism includes a mask.

According to still further features in the described preferred embodiments the mask is composed of an assembly of mask units, each of the mask units serves for creating a pattern element.

According to still further features in the described preferred embodiments the source device and the patterning mechanism are functionally integrated.

According to still further features in the described preferred embodiments the source device is composed of an assembly of source units, each of the source units serves for creating a pattern element.

According to still further features in the described preferred embodiments the detectable pattern includes a plurality of pattern elements selected from the group consisting of alphanumeric symbols, bar-code elements, array-code elements and intensity-code elements.

According to still further features in the described preferred embodiments a concentration and type of the mother isotope is selected such that implantation of the daughter isotopes into the surface of the object results in radioactivity whose magnitude is less than 10 Bq/g (currently the lowest approved regulatory limit).

According to still an additional aspect of the present invention there is provided a method of determining a presence of a specific radioactive pattern of a radioactive isotope being implanted in a predetermined pattern in a surface of an object, the method comprising the steps of (a) using a radioactivity detector for determining a presence of radioactive emission from the object; and (b) masking the object with a mask being designed to substantially shield the radioactivity detector from the predetermined pattern, such that if the object is radioactive and further if the mask substantially shields the radioactivity detector from the predetermined pattern, then the presence of the specific radioactive pattern of the radioactive isotope is positively determined, whereas if the object is either non-radioactive or if the object is radioactive and further if the mask fails to shield the radioactivity detector from the predetermined pattern, then the presence of the specific radioactive pattern of the radioactive isotope is negatively determined.

According to still further features in the described preferred embodiment the mother isotope is $^{226}$Ra.

According to still further features in the described preferred embodiments, the daughter isotope is selected from the group consisting of $^{222}$Rn, $^{210}$Pb, $^{210}$Bi and $^{210}$Po.

According to still further features in the described preferred embodiments the mother isotope is characterized by a half live time of a plurality of years.

According to still further features in the described preferred embodiments the daughter isotopes include at least one isotope characterized by a half live time of a plurality of days.

According to still further features in the described preferred embodiments the daughter isotopes include at least one isotope characterized by a half live time of a plurality of years.

According to still further features in the described preferred embodiments the object is of a value and is of a type of objects which are typically insured, numbered or licensed.

According to still further features in the described preferred embodiments the object is selected from the group consisting of a precious stone, a gem stone, a piece of antiquity, a weapon, a painting, a part of an engine, a part of a vehicle, a key, a CD/DVD, an electronic wafer, an integrated circuit and a solid consumer good.

According to still further features in the described preferred embodiments the object is an element which is usable in marking a second object.

According to still further features in the described preferred embodiments the element includes an adhesive.

According to still further features in the described preferred embodiments the step of implanting into the surface of the object the predetermined and detectable pattern of the daughter radioactive isotope is effected by positioning the object in close proximity to a source of a mother radioactive isotope.

According to still further features in the described preferred embodiments the source of the mother radioactive isotope is accompanied by a patterning mechanism so as to create the predetermined and detectable pattern of the daughter radioactive isotope.

According to yet an additional aspect of the present invention there is provided a method of marking an object of value, the method comprising the steps of (a) using a source of a mother isotope for implanting a predetermined and detectable pattern of daughter isotopes onto a surface of a stamp; and (b) attaching the stamp to the object for implanting grand-daughter isotopes onto a surface of the object, thereby replicating the predetermined and detectable pattern of daughter isotopes in a form of the grand-daughter isotopes onto the surface of the object.

According to further features in preferred embodiments of the invention described below, the stamp includes an adhesive, whereas the step of attaching the stamp to the object is effected by adhering the stamp via the adhesive to the surface of the object. According to still further features in the described preferred embodiments the mother isotope is $^{226}$Ra.

According to still further features in the described preferred embodiments the daughter isotope is $^{222}$Rn.

According to still further features in the described preferred embodiments the grand-daughter isotope is $^{210}$Pb, $^{210}$B and $^{210}$Po.

According to still further features in the described preferred embodiments the mother isotope is selected such that the daughter isotope is characterized by a half life time of a plurality of days and further wherein the grand-daughter isotope is characterized by a half life time of a plurality of years.

Further according to the present invention there is provided a method of establishing the authenticity of an object being marked with a radioactive code, the method comprising the steps of (a) storing in a database server information pertaining to at least one feature of the object and information pertaining to the radioactive code; (b) reading the radioactive code from the object; (c) based on the radioactive code retrieving from the database server the information pertaining to the at least one feature of the object; and (d) based on the at least one feature of the object retrieved from the database server and an actual feature of the object establishing the authenticity of the object.

The present invention successfully addresses the shortcomings of the presently known configurations by providing new horizons to object identification, which overcome the limitations associated with prior art designs.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a top view of a stamp according to the present invention;

FIG. 4 is a top view of a pattern according to one embodiment of the present invention;

DESCRIPTION OF THE PREFERRED EMBODIMENTS

Figure 1A:
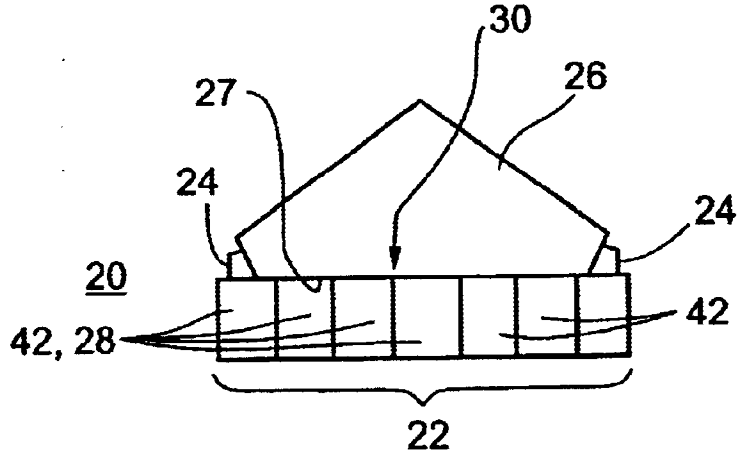
FIG. 1*a* is a cross sectional simplified depiction of one embodiment of an apparatus for marking an object according to the present invention.

The present invention is of an apparatus for and a method of radioactively marking objects, objects radioactively marked thereby and an apparatus for and a method of reading such radioactively marked objects which can be used for object identification. Specifically, the present invention can be used to mark objects of value, insured objects, numbered objects and/or licensed objects, with an invisible and substantially unremovable mark. The present invention can also be used to provide new means for implementing secured access to secured locations and to ascertain a legitimate, non-fraudulent, operation of a variety of devices.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a method of marking an object. The method according to this aspect of the present invention is effected by implanting into a surface of the object a predetermined and detectable pattern of a daughter radioactive isotope.

The method according to this aspect of the present invention is used for imprinting an identifiable, individual, covert fingerprint (or "mark") on a stable, solid surface; alternatively, on a surface which can be protected by a thin protective layer. The mark serves for validating the authenticity of the object, proving the identity of its owner and/or supplying some descriptive information about the object. As such, this method provides an additional means in the fight against counterfeiting and theft.

The basic mark is a trace radioactive isotope, emitting a detectable radiation (e.g., photons, electrons, alpha-particles, etc.), arranged in a predetermined geometrical pattern which, as is further detailed hereinbelow, can be reproduced by an external devices. The mark is embedded in the bulk of the object, under the surface, emitting nuclear radiation at a very slow rate. As such, the mark cannot be removed by conventional means. Because of the small distance of the emitters from that surface, substantially all of the emitted particles come out of the object. Alpha particles and beta particles (electrons) lose energy as they traverse material and change their direction at the same time. Since the energy of the particle is inconsequential for the purpose of the present invention (which involves mere counting or detection) it is sufficient to assure that the amount of material between the surface and the detector device is not too large. The range of the relevant alpha particles (e.g., from the decay of $^{210}$Po) or of the electrons (e.g., from the decay of $^{210}$Bi) in air is of the order of centimeters, so the detection can be carried out in normal atmospheric conditions. Photons, by contrast, do not lose energy but get absorbed in the material they traverse, thereby reducing the intensity of the beam. They are less useful as a means of detection of a localized source of radiation.

Figure 1B:
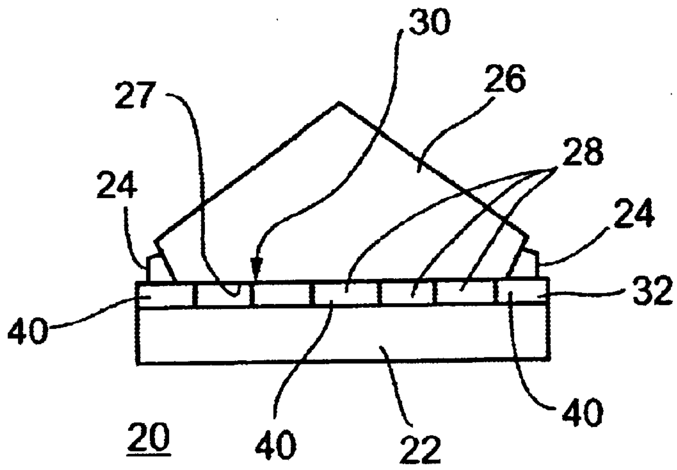
FIG. 1*b* is a cross sectional simplified depiction of another embodiment of an apparatus for marking an object according to the present invention.

Referring now to the drawings, FIGS. 1*a–b* illustrate an apparatus for marking objects according to the teachings of the present invention, which is referred to hereinbelow as apparatus 20 and which can be used to implement the method of the present invention described above.

Apparatus 20 includes a source device 22. Source device 22 includes a mother isotope which serves for emitting daughter isotopes by radioactive decay. Apparatus 20 preferably further includes a positioning mechanism 24. Positioning mechanism 24 serves for positioning an object, such as a gemstone 26, in close proximity to source device 22. It will be appreciated that mechanism 24 can be realized as an upper surface 27 of source device 22 in combination with gravitation. However, for most applications, more accurate positioning is required, and under such circumstances a more sophisticated positioning mechanism 24 is preferably employed. In the example shown, hooks are used for locating object 26 with respect to device 22. In other cases, wherein surface 27 is remote from source device 22, vacuum in a closed chamber can be employed. Apparatus 20 further includes a patterning mechanism 28. Mechanism 28 serves for restricting implantation of the daughter isotopes into a surface 30 of object 26, so as to create a detectable pattern of the daughter isotopes on object 26. An example of such a pattern in provided by FIGS. 7*a–c,* which is further described in the Examples section that follows.

Thus, the method step of implanting into the surface of the object the predetermined and detectable pattern of daughter radioactive isotope is effected by positioning the object in close proximity to a source of a mother radioactive isotope.

The primary (mother) isotope which generates the decay sequence is deposited on the outer surface of source device 22. A surface of device 22 may include many atomic layers of the mother isotope, enhancing the flux of recoiling daughter isotopes, by having recoils from some depth emerging as well. Alternatively, the primary isotope may be mixed with some lighter element, which does not reduce the effective range of the recoils in the composite material, but may contribute to mechanical and chemical stability.

One monolayer of a solid generally corresponds to an areal density of approximately $10^{15}$ atoms per cm$^2$. For the preferred primary isotope $^{226}$Ra, whose lifetime is $7.3 \cdot 10^{10}$ seconds, one has a flux of daughter nuclei ($^{222}$Rn) of approximately 7,000/cm$^2$/s (assuming that half the recoils point in the outer direction). The initial energy of the recoiling Rn atoms is about 100 keV and their range in solid Ra is about 7 nm, corresponding to about 20 monolayers. The desorption probability (namely, the probability to leave the solid with some residual kinetic energy) for the Rn atom goes down linearly from about 0.5 for the outermost layer to zero at a depth of about 20 monolayers. Thus, one expects the maximal flux from a Ra solid to be about 70,000/cm$^2$/s.

The range of a 100-keV ion (or atom) with mass number of about 222 is around 0.1 mm in air. Thus, in order for an efficient transfer of the recoils from one surface to another surface the two surfaces must be closer than 0.1 mm to one another. Actually, since some recoils emerge from the depth of the bulk, with a corresponding lowering of kinetic energy, this distance should be even smaller. Alternatively, coarse vacuum of 0.1 atm or better is sufficient to assure transfer without loss.

Figure 2:
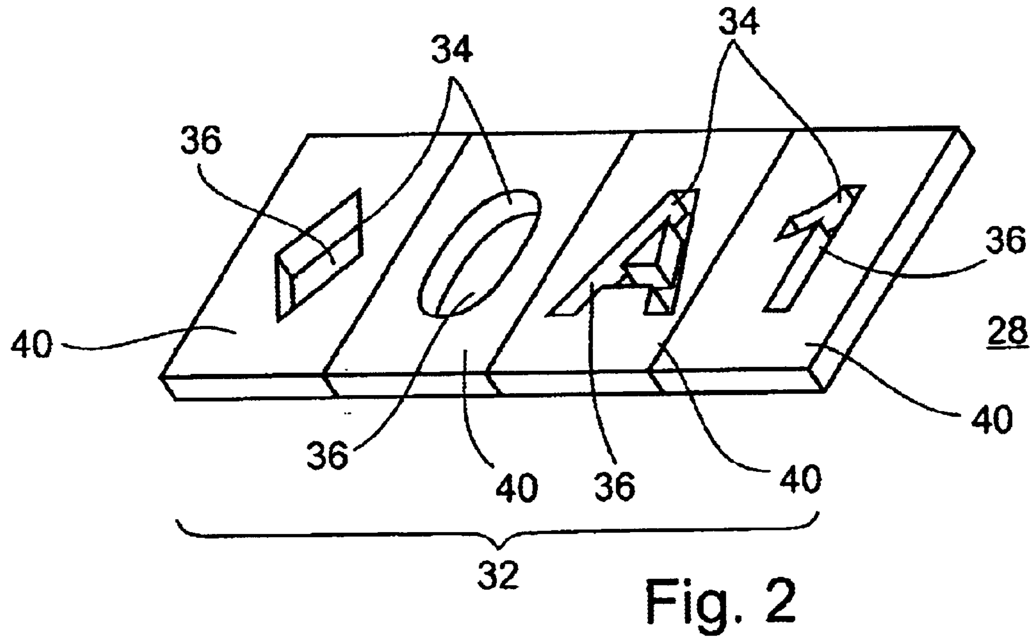
FIG. 2 is a perspective view of a mask according to the present invention.

According to a preferred embodiment of the present invention, and as specifically shown in FIG. 1*b* and 2 patterning mechanism 28 includes a mask 32. Depending on the radioactive source within device 22, mask 32 is made of a substance, and has a construction (e.g., thickness), which will absorb and/or deflect at least 80%, preferably at least 90%, more preferably at least 95%, ideally about 99–100%, of the radioactive particles or radiation emitted from the source. In addition, as is best seen in FIG. 2, mask 32 has a pattern 34 formed therein, which pattern allows, in a shape restrictive manner, for at least 80%, preferably at least 90%, more preferably at least 95%, ideally about 99–100%, of the radioactive particles or radiation emitted from the source to pass through pattern 34. In one embodiment pattern 34 is formed by creating cut-through openings 36 in the body of mask 32. In another embodiment pattern 34 is formed varying the thickness and/or the material of make of mask 32. The pattern can be a positive or negative pattern. A negative patterns can be readily achieved, for example, by using standard printing techniques, using for example lead particles containing printing substances. It will be appreciated that mask 32 can form a part of apparatus 20. Alternatively, mask 22 can be attached to an object to be marked. The physical thickness of mask 32 should be small compared to the lateral dimensions of the exposed areas making up the pattern. This is important to avoid the effect of shadowing by the mask structure and to define properly the borders of the marked zone(s).

According to a preferred embodiment of the present invention mask 32 is composed of an assembly of mask units 40, wherein each of mask units 40 serves for creating a pattern element.

According to another preferred embodiment of the present invention, as is specifically shown in FIG. 1*a,* source device 22 and patterning mechanism 28 are functionally integrated. In the example of FIG. 1*a,* source device 22 is composed of an assembly of source units 42, each of which serves for creating a pattern element. In this case, the radioactive source in each of units 42 is placed thereat following a preselected pattern.

In any case, as is shown in FIGS. 2 and 7*a–c,* the detectable pattern includes a plurality of pattern elements which can be alphanumeric symbols (e.g., the letters A–Z and digits 0–9), linear or circular bar-code elements (e.g., an assembly of linear bars or concentric circles of varying thickness) array-code elements (see FIG. 4 and the description thereof that follows) or intensity-code elements (e.g., an assembly of linear bars or concentric circles of varying radioactive intensity).

The concentration and type of the mother isotope is selected according to the present invention such that implantation of the daughter isotopes into surface 30 of object 36 results in radioactivity whose magnitude is less than the lowest approved regulatory limit, e.g., less than 10 Bq/g. It will be appreciated that using the methods of the present invention, as is further detailed hereinunder, even such low radioactivity is readily detectable.

Thus, after being marked by apparatus 20 of the present invention, surface 30 of object 26 includes implanted therein a predetermined and detectable pattern of a radioactive isotope. Typically the object marked is of a value and is of a type of objects which are typically insured, numbered or licensed. Examples include, yet are not limited to, precious stones (e.g., diamonds), gemstones, antiquity, weapons such as guns and pistols, paintings, parts of engines, parts of vehicles and, as is further detailed hereinunder, keys.

However, according to a specific and presently preferred embodiment of the present invention the object is an element which is usable in marking a second object. Such an element is referred to hereinbelow as stamp 46 and is shown in FIG. 3. Preferably stamp 46 includes an adhesive and is preferably flexible so as to closely follow a contour of a surface.

Thus, according to a presently preferred embodiment of the present invention apparatus 20 is used for implanting a predetermined and detectable pattern of daughter isotopes onto a surface of stamp 46. Stamp 46 is then attached to object 26 for implanting grand-daughter isotopes onto surface 30 thereof, thereby replicating predetermined and detectable pattern of daughter isotopes in a form of grand-daughter isotopes onto surface 30 of object 26. Stamp 46 preferably includes an adhesive, whereas the step of attaching stamp 46 to object 26 is effected by adhering stamp 46 via the adhesive to surface 30 of object 26. According to a presently preferred embodiment, the mother isotope is selected such that daughter isotope is characterized by a half life time of a plurality of days and further wherein the grand-daughter isotope is characterized by a half life time of a plurality of years. Thus, the radioactivity of stamp 46 is short lived, yet it lasts for a sufficient time period so as to be forwarded around the globe, while, at the same time, rendering stamp 46 safely disposable some predetermined time after use, whereas object 26 remains detectably marked for years to come.

Thus, in accordance with the teachings of the present invention the final object marking isotope can be transferred into the isotopically marked object by a number of alternative ways: (i) direct implantation from the source, by placing the two in close proximity under, for example, an appropriate vacuum or atmospheric pressure; and (ii) indirect implantation through the use of a stamp, the latter being in proximity to the object under, for example, an appropriate vacuum or atmospheric pressure. In the latter case, the stamp preferably includes an adhesive, which can be a permanent or detachable adhesive.

Indirectly marking object 26 using stamp 46 is particularly desirable for a number of reasons, as follows. First, presuming that the stamp is not removed until the process is completed, the entire population available for implantation into the object is actually utilized. Second, the geometric efficiency of implantation is maximal because of the inherent contact with the object's surface. Third, the application of the stamp is immediate and quick. Finally, it is possible to apply the stamp on complex, non-planar surfaces.

A radioactive isotope decays with some typical lifetime $\tau_1$, or—equivalentlty —with a characteristic half-life, also known as $t_{t/2}$. An initial population of N isotopes is reduced by a factor of two with every passing half-life. If the daughter of the original isotope is stable, this single decay is the entire physical event. Asymptotically, all the initial population of radioactive isotopes will transmute into the stable daughter. If the daughter of the first isotope is itself radioactive, with some lifetime $\tau_2$, then one obtains a chain of decays. There are two general types of such chains, depending on how $\tau_2$ is compares with $\tau_1$. If $\tau_2$ is longer (much longer) then $\tau_1$, the first isotope will completely decay, as before, leaving the daughter to slowly decay eventually with its own characteristic lifetime. If, however, $\tau_2$ is (much) shorter than $\tau_1$, radioactive equilibrium will be established between the two isotopes, with the ratio of their populations approximately equal to the ratio of the corresponding lifetimes. In this case, the primary, long-lived isotope is said to generate the secondary, shorted lived isotope. The existence of additional intermediate isotopes in a longer chain dose not change this basic generic classification. Note, that the entire process, complicated as it might be, is governed by simple mathematical formulas.

Specifically the following decay chain is preferred for use with the present invention. $_{226}$Ra - - - (α; τ=1,600 y) - - - >$^{222}$Rn - - - (α, τ=3.8 d) - - - > $^{218}$Po - - - (α; τ=3 m) - - - >$^{214}$Pb - - - (β; τ=27 m) - - - >$^{214}$Bi - - - (β; τ=20 m) - - - >$^{214}$Po - - - (α; τ=164 μs) - - - >$^{210}$Pb - - - (β; τ=22 y) - - - >$^{210}$Bi - - - (β; τ=5 d) - - - >$^{210}$Po - - - (α; τ=138 d) - - - >$^{206}$Pb (stable). The primary (mother) isotope is $^{226}$Ra, the active (daughter) isotope in stamp 46 is $^{222}$Rn, which the marking (grand-daughter) isotope in object 26 is $^{210}$Pb which reaches equilibrium with $^{215}$Po. All other intermediate isotopes are much shorter lived and play no important role. The skeleton decay scheme, with long—short—long half-lives enables the use of indirect marking using stamp 46. With present day transportation means, $^{222}$Rn is sufficiently long-lived to permit transfer of stamp 46 around the globe. According to this scheme the source of mother isotope within apparatus 20 is kept in a safe place and is approached by personnel skilled in handling radioactive sources. Such personnel produces stamps 46 with unique radioactive patterns thereon which are then safely shipped globe wide as required. These stamps include a minimal amount of radioactivity with fast decay time and are thereafter used by any personnel for marking any desired object as is described above. Source radioactive intensity and stamp exposure time can be readily calculated so as to achieve these desired results.

Thus, any object 26 can be directly or indirectly (using stamp 46) marked using apparatus 20 and the marking method of the present invention. The basic physical effect used for marking is the recoil imparted to a daughter nucleus upon the alpha-decay of its parent. The daughter receives an energy of about 100 keV, which is sufficient to implant it at a depth of 10 to 100 nanometers in any material. As is mentioned hereinabove, this "recoil implantation" can be implemented directly, to implant a radioactive daughter from a parent generator into a surface of an object to be marked. Alternatively, it can be implemented indirectly, by recoil-implanting the daughter, itself a long-lived alpha-emitter, into an intermediate surface and subsequently recoil-implanting its daughter into the final surface.

The authenticity of the mark and its informational content may be inherent to one or more the following: (i) the identity of the emitted radiation; (ii) the overall intensity of the mark (which follows a known temporal degradation beginning with a known initial value); (iii) the geometric pattern of the mark; and (iv) optional intensity variations across the pattern.

The mark embedded into the surface of the object can be either an individually applied one, unique to that object, or one common to a larger group of objects of, for example, the same type. It could signify a particular manufacture, a particular batch or the like. Although there are numerous possibilities of constructing an information carrying mark, let us describe here one specific choice, which is ideally suitable from the points of view of versatility, ease of production and simplicity of detection.

Referring now to FIG. 4, consider an array of m=n pixels, of which exactly p are active. Two pixels at the corners on one major diagonal of the array are always active, in order to allow the geometric positioning of the entire mark on the surface. One of the corners on the other diagonal is always non-active, to avoid possible ambiguities in positioning. Thus N, the total number of possible different combinations of individually distinguishable marks is given by {(mn-3) C (p)}, the combinations of p objects out of (mn-3). As an example, if the total area to be marked is 3×3 mm$^2$, if the pixel linear size is ⅓ mm (easily above the minimal available position sensitive resolution) and if 10 pixels are active, the total number of combinations is more than $10^{12}$. By increasing p, the number of active pixels, this number could be made considerably larger yet. The maximal N which can be obtained in this particular example is about 2.7–$10^{22}$. The fact that the number is so large enables a number of logical anti-counterfeiting measures, such as employing an algorithm for selecting the actual combinations which are actually in use. In addition, one may select the combinations in such a way, that the overlap between different combinations will be minimal. This reduces the need to identify all active pixels and reduces the identification time. This time is basically determined by the time it takes for a single active pixel to be identified.

Beside the logical anti-counterfeiting measures, one cam employ physical measures as well. Still using the pixel matrix example, it is possible to choose one (or more) specific pixels at random in a particular stamp and making them slightly stronger. This is achieved, for example, by somewhat enlarging the unmasked area. If a logically legitimate mark is suspected for some reason as counterfeit, it may be subjected to an especially long identification procedure. By gathering enough statistics on all pixels, the authenticity of the mark can be established beyond doubt.

Figure 5:
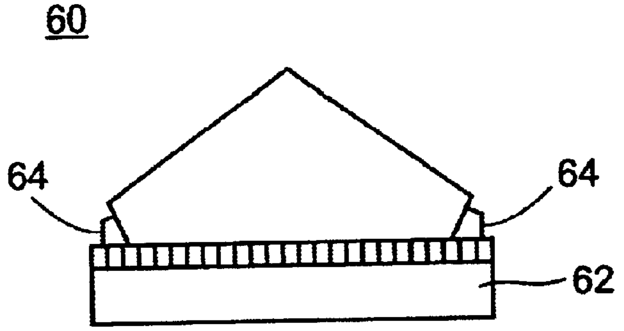
FIG. 5 is a simplified cross sectional view of an apparatus for detecting a radioactive pattern of a radioactive isotope being implanted in a predetermined and detectable pattern in a surface of a three dimensional object.

According to another aspect of the present invention there is provided a method of detecting a radioactive pattern of a radioactive isotope being implanted in a predetermined and detectable pattern in a surface of a three dimensional object. The method according to this aspect of the present invention is effected by providing a position sensitive radioactivity detector; and positioning the surface of the three dimensional object in close proximity to position sensitive radioactivity detector. As is shown in FIG. 5, the method according to this aspect of the present invention is preferably effected by an apparatus which is referred to hereinbelow as apparatus 60. Apparatus 60 includes a position sensitive radioactivity detector 62, such as, but not limited to, a radiosensitive emulsion film or a radiosensitive plate having a position sensitive array of radioactivity micro detectors. Apparatus 60 further includes an acceptor 64 for accepting the three dimensional object and for positioning the surface of the three dimensional object in close proximity to position sensitive radioactivity detector 62 so as to permit detection of the pattern by position sensitive radioactivity detector 62. Thus, apparatus 60 can be used to read the surface radioactivity of objects radioactively marked as described above. In particular, a radiosensitive plate can be designed to monitor only those disintegrations with energy level which matches the level of energy expected from the marking isotope employed, so as to improve the signal to noise ratio.

It will be appreciated that the detection of the emitted radiation from an object can be performed either directly, by a suitable detector or indirectly, by generating and transferring a corresponding imprint on an intermediate surface, to be measured later by an appropriate device.

Direct reading can be done using (i) a position sensitive device with an appropriate resolution, such as, but not limited to, a microchannel-plate, a microsphere-plate or a solid-state multistrip detector; (ii) sequential scanning by detector to identify individually marked regions, which is more suitable for large marked areas; or by (iii) matching an assumed imprint against a "negative" of the original marking mask.

Indirect reading can be done using (i) autoradiography, where an exposed film is developed later, permitting very high spatial resolution; or (ii) a radioactivity imaging plate, such as the "FUJIPLATE" by the FUJIFILM Company, i.e., exciting isomeric state which is then de-excited by laser, emitting photons which are processed by a photomultiplier tube. This option permits extremely low levels of marking activity.

The preferred mode of detecting the mark is by the use of a radioactivity imaging plate. There are many reasons for that, including, but not limited to, (i) the method is the most sensitive available and is ideally suited for the extreme low levels of activity to be used (particularly for small area marks); (ii) the mark can be lifted off the object and analyzed at a later time; (iii) there is a very good spatial resolution, reaching about 100 microns; (iv) the technology is fully developed and is readily available.

Thus, a method of detecting a radioactive pattern of a radioactive isotope implanted in a predetermined and detectable pattern in a surface of a three dimensional object may include the steps of implanting radioactive emitted from the object into a surface of an intermediate medium; and positioning said surface of said intermediate medium in close proximity to a position sensitive radioactivity detector so as to permit detection of said pattern by said position sensitive radioactivity detector.

Figure 6:
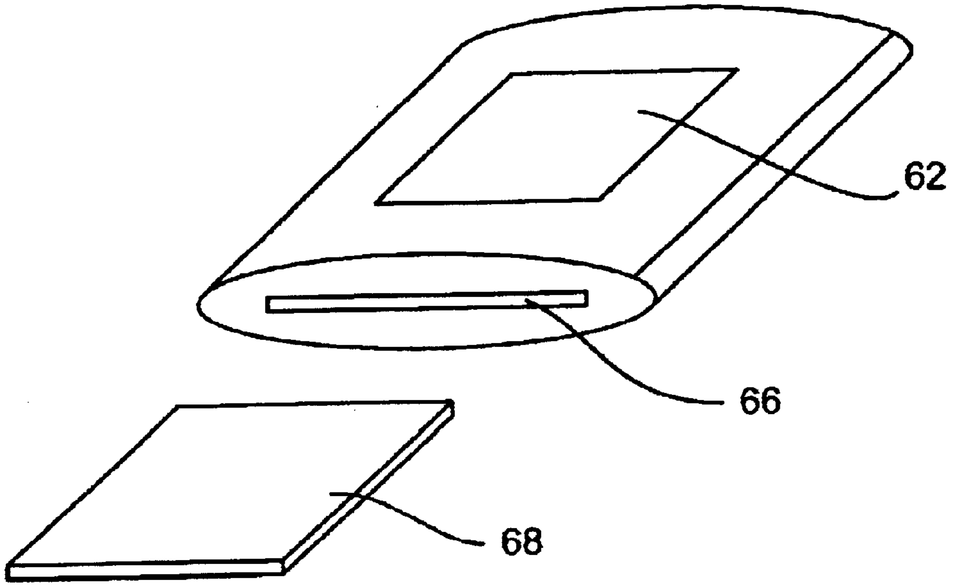
FIG. 6 is a simplified perspective view of a keyhole and key according to the present invention.

In one embodiment of the present invention, as is specifically shown in FIG. 6, acceptor 64 is a keyhole 66, whereas, the three dimensional object is a key 68, such that only a specific pattern provided on a surface of key 68, as is detected by position sensitive radioactivity detector 62 which is integrated into keyhole 64, results in that keyhole 66 operatively responds to key 68. Key 68 can be formed as a card whereas keyhole 66 a a slit. This design allows for restricted access to secured locations, either geographical locations, and/or electronic locations. Such a key—keyhole design can be implemented in automatic cash machines (ATMs), etc.

The novel marking technique presented by the present invention can find uses in a plurality of applications, some of which are listed and described hereinbelow.

It is common practice to issue certificates attesting to the identifying features and qualities of individual diamonds. Clearly, the absolute correspondence between a stone and its certificate is never certain, unless, there is a physical identifying mark on the stone itself. Such a mark can be imprinted on the stone using the novel technology of the present invention. Based on this technology, a universal certification and authentication system can be established.

In this case, a business methodology may include a central facility which will produce transferable stamps, few local marking centers where certificates are issued, and a large number of reading devices distributed among users, such as diamond dealers and insurance companies. In addition, there may be a central secure database connected by a suitable network (e.g., the Internet) to the marking and reading sites.

In the simplest mode of operation, stamps are produced in a final form at the central facility and shipped for application onto the diamonds at the marking centers. Each stamp, typically measuring 2×2 or 3×3 $mm^2$, harbors a pattern which codifies a unifying code (e.g., a numerical code). Codes are chosen randomly using an algorithm as an anti-counterfeiting measure. At the marking center each stone is assigned a (different) number. That number, along with all the relevant information about the stone are stored in the central database for furter retrieval. Each time a marked stone is read, the number is transmitted to the central database to obtain the tagged information.

Certain modifications of this procedure are possible. For example, some of the characteristics of the stone, such as weight, color and quality, may be directly interpreted by the reading device, without necessarily approaching the database. In addition, the specific code-bearing pattern of the stamp may be physically created at the marking site itself. In this case, the central facility supplies a blank stamp, onto which the pattern is "engrave", for example by laser removal of appropriate portions. The pattern itself may be either transmitted from the database or created locally by the algorithm.

The need to positively identify specific objects often arises in a number of scenarios. For example, it is crucial in establishing ownership of stolen goods (such as art objects) and thus may play a useful role in the insurance industry. The technology of the present invention is ideally suited for this purpose.

Individual objects may be branded by marking with one, or more, identifying patterns. The location, number and nature of these marks are securely kept by a central database for eventual use. Finding all, or possibly some, of these covert marks provides absolute and uncontroversial proof of ownership. Since marks can be lifted and checked even if they are very weak, it is advantageous to keep them indeed as weak as possible, to render their unauthorized detection more difficult.

A close derivative of this application is the use of the covert mark as a seal of authenticity by manufacturers of spare parts.

Checking documents for authenticity is a recurring problem in many areas. One particular example is the need to validate passports (or other identifying documents) against total or partial falsification. Indeed, much effort is going into this by governments and security agencies globe wide. Such efforts often result in the establishment of common standards in the design of, say, passports. The present invention may add to this a further layer of security, particularly since it can be implemented on existing documents.

A preferred mode of implementation involves the marking of the passport by a covert pattern (or "seal") of specific shape and approximate strength. The location of the seal is determined, through an algorithm, by the ensemble of information specific to the document (personal data, photography, etc.). Checking the validity involves two stages. First, the existence of a mark of the right approximate strength is established. Second, the expected location of the mark is determined and is verified.

This verification is done by placing a blocking seal on the expected location, thereby completely preventing the detection of the mark.

Weapons, such as handguns, always come with identifying serial numbers. These, however, are often erased when a weapon is used for conducting criminal activities or for illicit trade, rendering difficult the tracing of its origin. The present invention provides a means for placing a covert identification number in one, or more, secret locations on the weapon. In particular, it is technically possible to place the mark (and eventually read it) inside the muzzle of the gun.

The unauthorized copying and distribution of media, such as CD's and DVD's, results in major revenue losses worldwide. It is possible to mark such media using the technology described herein, in order to allow the validation of the authenticity of a given item. It is furthermore possible to devise a system, based on this method, which will totally prohibit the use of such illegal copies.

To this end, a simple alpha-particle detection device is incorporated into a DVD player. The continued operation of the player is logically coupled to the detection of an appropriate signal arriving from the disk. In the absence of such a signal, the disk is automatically ejected after a prescribed length of time, rendering its use practically impossible. The signal may emerge from a number of locations on the disk, with the system analyzing the phase relation between the various sources, thereby providing an additional layer of security against counterfeiting.

The general logic of the passport checking procedure may be extended to an access control system, which is based on the technology presented herein. It is designed to restrict the opening of locks to authorized keys only and to practically prohibit the copying of such keys.

The "key", marked with an elaborate pattern is inserted into the "lock" and stops at a first position. At this position the active area is detected and its intensity measured. If this corresponds to the right level, the key is allowed to travel further to a second position. At this position the pattern of the mark is validated, by covering it with an appropriate blocking marks, and demanding the disappearance of the observed signal. Having passed this test, the opening of the locking mechanism is enabled. Thus, the present invention also provides a method of determining a presence of a specific radioactive pattern of a radioactive isotope implanted in a predetermined pattern in a surface of an object. The method is effected by using a radioactivity detector for determining the presence of radioactive emission from the object; and masking the object with a mask designed to substantially shield the radioactivity detector from the predetermined pattern, such that if the object is radioactive and further if the mask substantially shields the radioactivity detector from the predetermined pattern, then the presence of the specific radioactive pattern of the radioactive isotope is positively determined whereas if the object is either non-radioactive or if the object is radioactive and further if the mask fails to shield the radioactivity detector from the predetermined pattern, then the presence of the specific radioactive pattern of the radioactive isotope is negatively determined.

EXAMPLE

Additional objects, advantages, and novel features of the present invention will become apparent to one ordinarily skilled in the art upon examination of the following example, which is not intended to be limiting. Additionally, each of the various embodiments and aspects of the present invention as delineated hereinabove and as claimed in the claims section below finds experimental support in the following example.

Figure 7A:
FIGS. 7*a–c* show examples of patterns imprinted on the face of three diamonds using the method of the present invention.
Figure 7B:
Figure 7C:

FIGS. 7*a–c* provide Examples of patterns imprinted on the face of diamonds illustrating a particular implementation of the basic principle of the present invention. A rectangular array of holes, with appropriately selected ones blocked, was used to form the patterns. This specific array had 5×7 holes, each 0.4 mm in diameter, with centers separated by 0.5 mm. A small amount (about 0.05 nanocuries) of alpha-emitters was recoil-implanted through the open holes into the surfaces of the diamonds. The diamonds thus marked were put on a FUJIPLATE for about two minutes and the plate was subsequently scanned, with a 100 micron resolution, yielding the observed patterns. Note the ability to resolve neighboring pixels (holes) and to differentiate unambiguously activated from non-activated ones. The number of different patterns which can be formed by this particular mask is in the billions.

Figure 8:
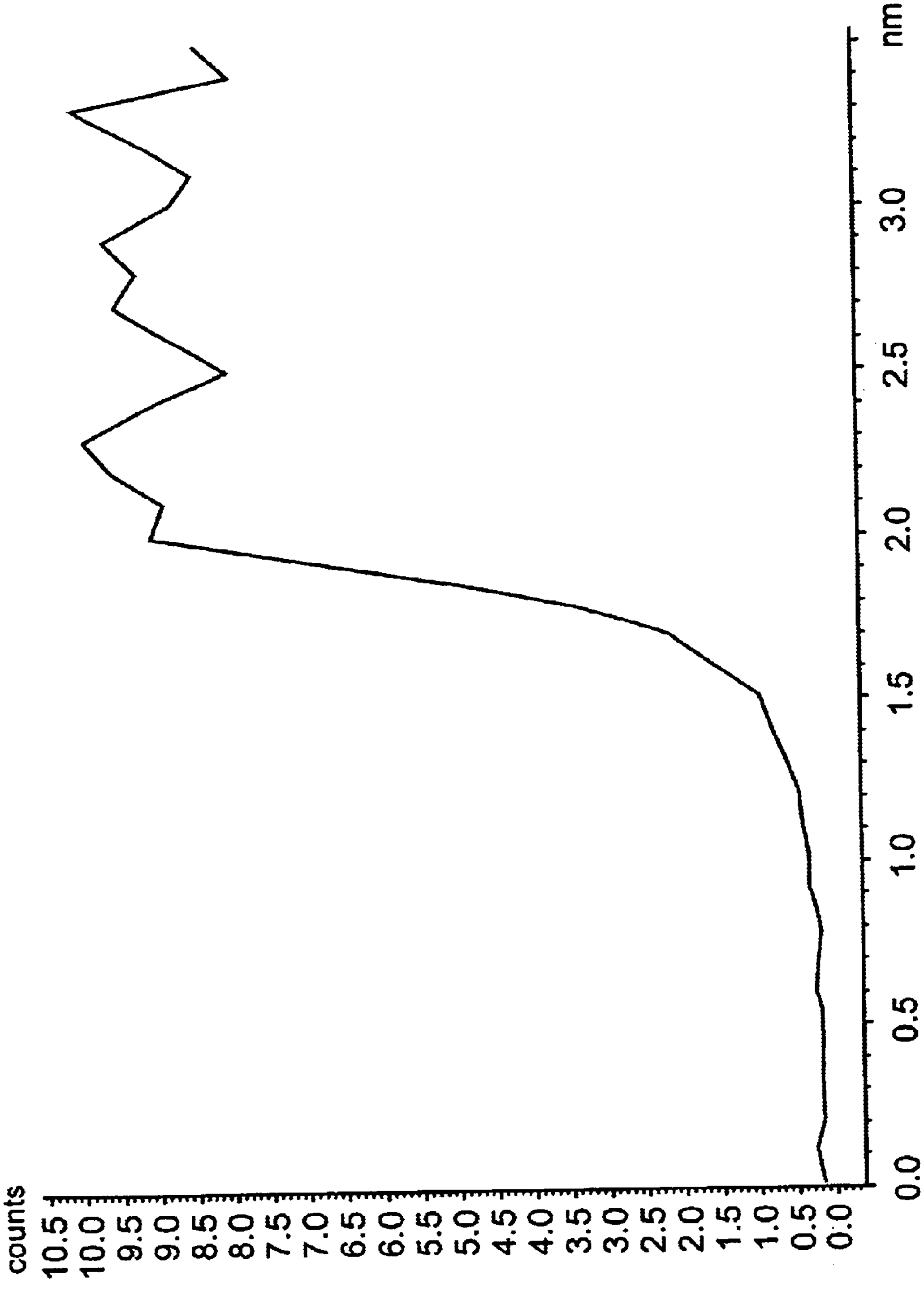
FIG. 8 shows the observed average intensity in marked vs. unmarked areas shown in FIGS. 7*a–c*.

FIG. 8 shows the observed average intensity in marked versus unmarked areas on the FUJIPLATE in this demonstration. The signal-to-noise ratio is about 30. This can be arbitrarily increased by using exposure times longer than the 2 minutes used in practice.

Although the invention has been described in conjunction with specific embodiments thereof, it is evident that many alternatives, modifications and variations will be apparent to those skilled in the art.

Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of marking an object of value, the method comprising the steps of:

(a) using a source of a long-lived mother isotope for implanting a predetermined and detectable pattern of short-lived daughter isotopes onto a surface of a removable stamp; and (b) attaching said removable stamp to the object for implanting long-lived grand-daughter isotopes onto a surface of the object, thereby replicating said predetermined and detectable pattern of daughter isotopes in a form of said grand-daughter isotopes onto said surface of said object.

2. The method of claim 1, wherein said stamp includes an adhesive, whereas said step of attaching said stamp to the object is effected by adhering said stamp via said adhesive to said surface of the object.

3. The method of claim 1, wherein said mother isotope is $^{222}$Ra.

4. The method of claim 1, wherein said daughter isotope is $^{222}$Rn.

5. The method of claim 8, wherein said grand-daughter isotope is $^{222}$Rn and its daughter isotopes $^{310}$Pb, $^{210}$Bi and $^{210}$Po.

6. The method of claim 1, wherein said mother isotope is selected such that said daughter isotope is characterized by a half life time of a plurality of days and further wherein said grand-daughter isotope is characterized by a half lift time of a plurality of years.

7. The method of claim 1, wherein the object of a type which is typically insured, numbered or licensed.

8. The method of claim 1, wherein the object is selected from the group consisting of a precious stone, a gem stone, a piece of antiquity, a weapon, a painting, a part of an engine, a part of a vehicle, a key, a CD/DVD, an electronic wafer, an integrated circuit and a solid consumer good.

9. A method of determining a presence of a specific radioactive pattern of a radioactive isotope being implanted in a predetermined pattern in a surface of an object, the method comprising the steps of:

(a) using a radioactivity detector for determining a presence of radioactive emission from the object; and (b) masking the object with a mask being designed to substantially shield said radioactivity detector from said predetermined pattern, such that if said object is radioactive and further if said mask substantially shields said radioactivity detector from said predetermined pattern, then the presence of the specific radioactive pattern of the radioactive isotope is positively determined, whereas if said object is either non-radioactive or if said object is radioactive and further if said mask fails to shield said radioactivity detector from said determined pattern, then the presence of the specific radioactive pattern of the radioactive isotope is negatively determined.

* * * * *

UNITED STATES PATENT AND TRADEMARK OFFICE

CERTIFICATE OF CORRECTION

PATENT NO. : 6,616,051 B1
DATED : September 9, 2003
INVENTOR(S) : Zidon

It is certified that error appears in the above-identified patent and that said Letters Patent is hereby corrected as shown below:

Title page,
Item [73], the name of the Assignee should be: -- Authentis Ltd. --

Signed and Sealed this

Sixteenth Day of December, 2003

JAMES E. ROGAN
*Director of the United States Patent and Trademark Office*